United States Patent
Kramer (10) Patent No.: US 10,686,180 B2
(45) Date of Patent: Jun. 16, 2020

(54) BATTERY PROTECTION SYSTEM

(71) Applicant: MILWAUKEE ELECTRIC TOOL CORPORATION, Brookfield, WI (US)

(72) Inventor: Scott G. Kramer, Brookfield, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 210 days.

(21) Appl. No.: 15/834,373

(22) Filed: Dec. 7, 2017

(65) Prior Publication Data

US 2018/0166674 A1 Jun. 14, 2018

Related U.S. Application Data

(60) Provisional application No. 62/431,962, filed on Dec. 9, 2016.

(51) Int. Cl.
*H01M 2/34* (2006.01)
*B25F 5/02* (2006.01)
*H01M 2/10* (2006.01)

(52) U.S. Cl.
CPC ............... *H01M 2/34* (2013.01); *B25F 5/02* (2013.01); *H01M 2/1022* (2013.01); *H01M 2200/00* (2013.01); *H01M 2220/30* (2013.01)

(58) Field of Classification Search
CPC .. H01M 2/34; H01M 2/1022; H01M 2200/00; H01M 2220/30; B25F 5/02
USPC .......................................................... 429/428
See application file for complete search history.

(56) References Cited

U.S. PATENT DOCUMENTS

| | | | |
|---|---|---|---|
| 4,107,765 | A | 8/1978 | Singleton et al. |
| 4,551,028 | A | 11/1985 | Rowan et al. |
| 5,380,602 | A | 1/1995 | Kato et al. |
| 6,329,095 | B1 | 12/2001 | Farnworth et al. |
| 6,368,287 | B1 | 4/2002 | Hadas |
| 6,389,143 | B1 | 5/2002 | Leedom et al. |
| 6,410,997 | B1 | 6/2002 | Sjursen et al. |
| 6,667,936 | B1 | 12/2003 | Ditzig |
| 6,889,840 | B2 | 5/2005 | Schein et al. |
| 7,190,147 | B2 | 3/2007 | Gileff et al. |
| 7,267,550 | B1 | 9/2007 | Eckberg et al. |
| 7,871,720 | B2 | 1/2011 | Myers et al. |
| 8,086,306 | B2 | 12/2011 | Katzman et al. |
| 9,077,055 | B2 | 7/2015 | Yau |
| 9,189,663 | B2 | 11/2015 | Goren et al. |
| 9,314,900 | B2 | 4/2016 | Vanko et al. |
| 2009/0321304 | A1 | 12/2009 | Watson |
| 2011/0101780 | A1 | 5/2011 | Johnson |
| 2014/0141309 | A1 | 5/2014 | Suzuki |
| 2014/0355207 | A1 | 12/2014 | Stephens et al. |

(Continued)

FOREIGN PATENT DOCUMENTS

WO 2015182050 12/2015

*Primary Examiner* — Gary D Harris
(74) *Attorney, Agent, or Firm* — Michael Best & Friedrich LLP (57) ABSTRACT

A battery protection system for a power tool includes a power tool housing with a battery pack interface. The battery pack interface includes at least one tool electrical terminal. The battery protection system also includes a battery with a battery housing and at least one battery electrical terminal and a divider positioned between the at least one battery electrical terminal and the at least one tool electrical terminal. The divider includes at least one fold.

10 Claims, 12 Drawing Sheets

(56) References Cited

U.S. PATENT DOCUMENTS

2016/0126533 A1* 5/2016 Velderman .......... H01M 10/425
                                                    429/97
2016/0260958 A1    9/2016  Weir et al.
2016/0276678 A1    9/2016  Jorgensen et al.
2016/0329536 A1   11/2016  Dorr et al.

* cited by examiner

BATTERY PROTECTION SYSTEM

CROSS REFERENCE TO RELATED APPLICATIONS

This application claims priority to U.S. Provisional Patent Application No. 62/431,962 filed Dec. 9, 2016, the entire content of which is incorporated herein by reference.

FIELD

Embodiments relate to power tools, and more particularly, to a battery protection system for a power tool.

BACKGROUND

During shipping, battery packs may be physically connected to power tools within a kit. Although not in operation, when connected, the power tool may draw power from the battery packs. This connection during transport may result in the end user receiving a battery having low voltage and being inoperable.

SUMMARY

One embodiment provides a battery protection system for a power tool including a power tool housing including a battery pack interface. The battery pack interface includes at least one tool electrical terminal. The battery protection system also includes a battery with a battery housing and at least one battery electrical terminal and a divider positioned between the at least one battery electrical terminal and the at least one tool electrical terminal. The divider includes at least one fold.

Another embodiment provides a divider for a battery protection system of a power tool including a battery receptacle having a battery receptacle terminal, the battery receptacle configured to receive a battery pack having a battery pack terminal. The divider includes an outer portion with an indicator and an inner portion with a stem extending from the outer portion. The stem galvanically isolates the battery receptacle terminal and the battery pack terminal.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
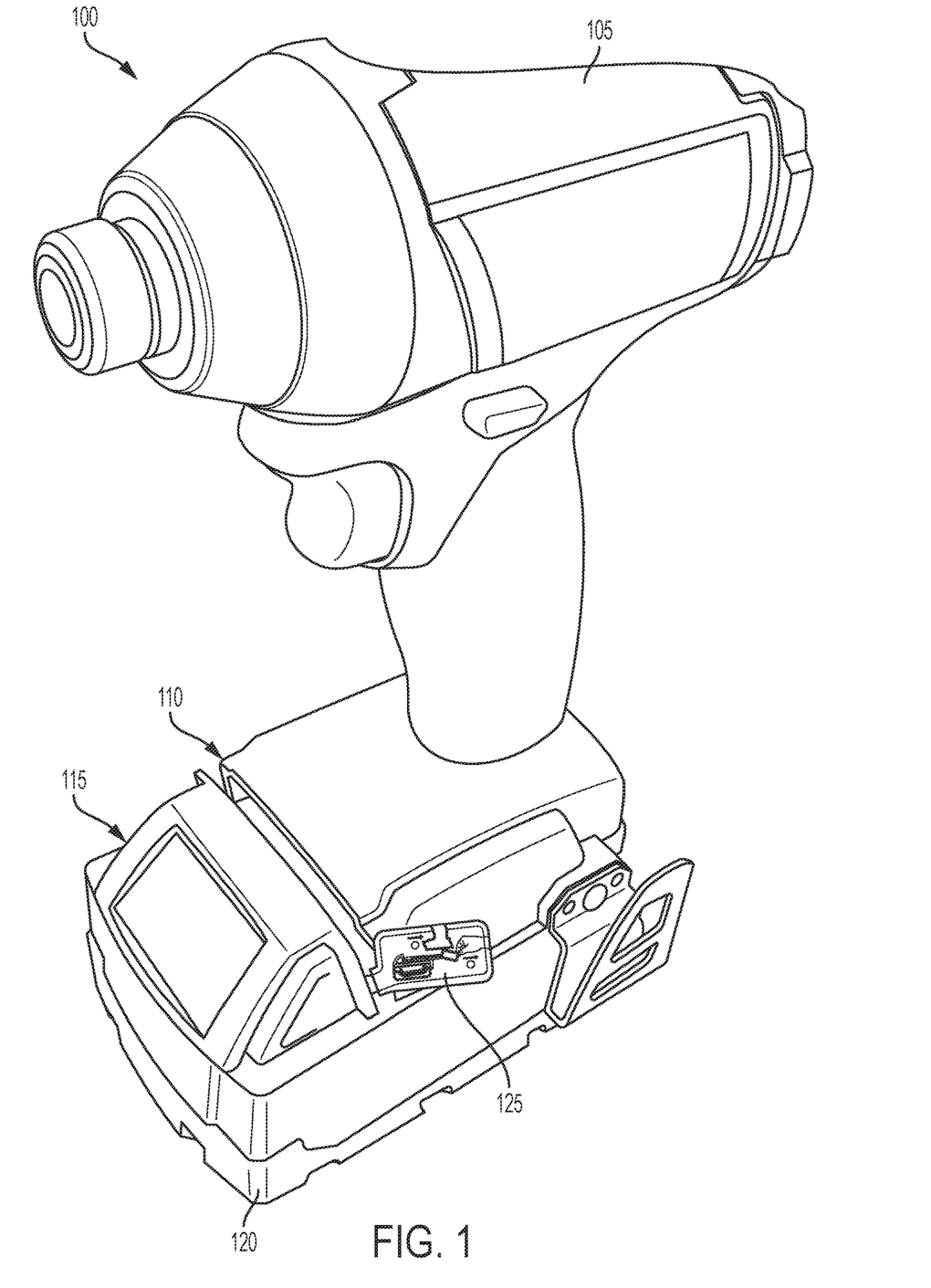
FIG. 1 illustrates a perspective view of a power tool according to one embodiment.
Figure 2:
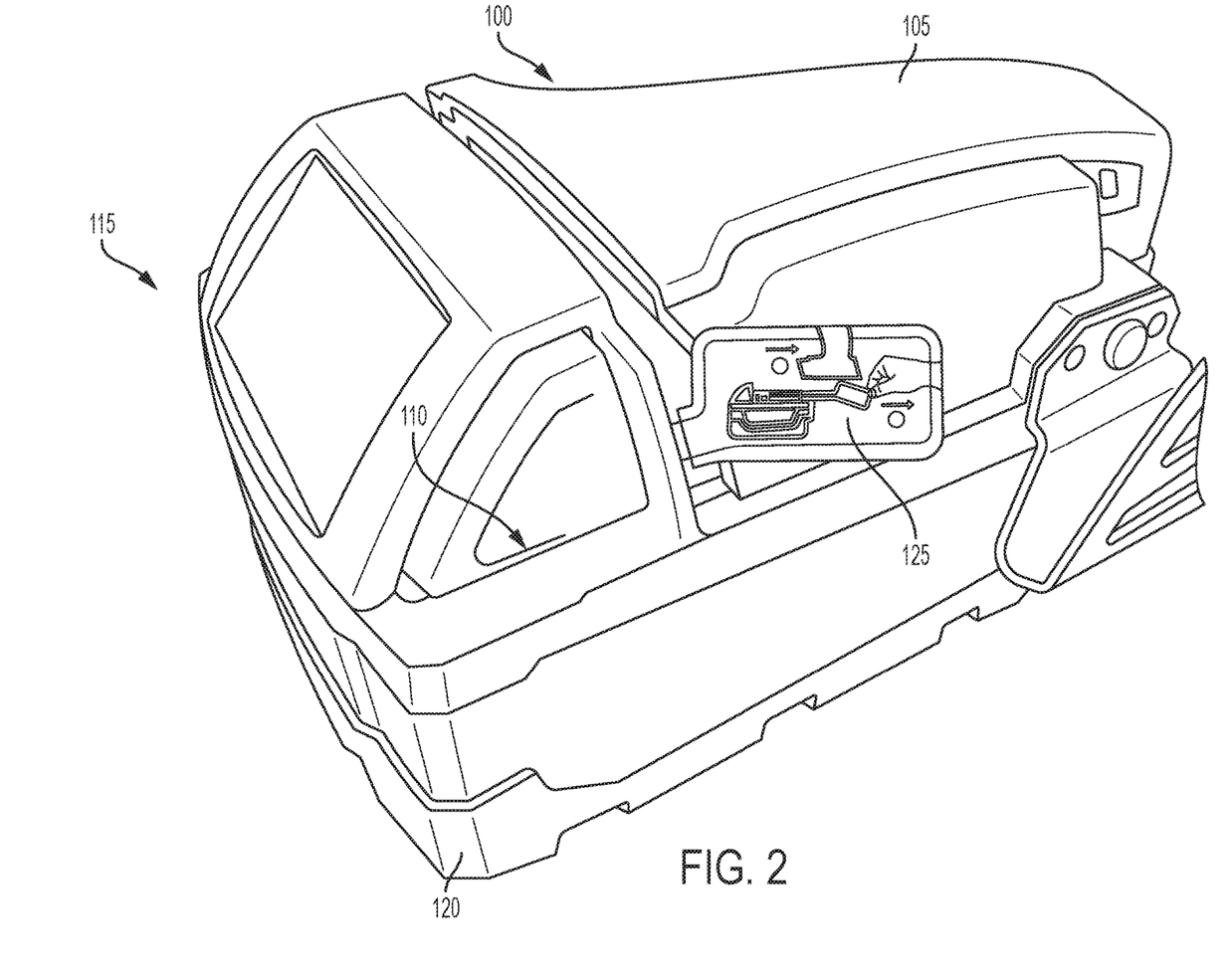
FIG. 2 illustrates an enlarged perspective view of the power tool of FIG. 1 connected to a battery pack according to one embodiment.

FIGS. 1 and 2 illustrate a power tool 100 according to one embodiment of the invention. Although illustrated as a power drill, in other embodiments, the power tool 100 may be another power tool and/or outdoor tool, for example but not limited to, a miter saw, a rotary hammer, a power saw, a chainsaw, a leaf blower, and a string trimmer.

The power tool 100 includes a power tool housing 105 having a battery pack interface 110 to physically and electrically connect to a battery pack 115 having a battery pack housing 120. In some embodiments, the battery pack interface 110 includes a positive tool terminal, a ground tool terminal, and a communication tool terminal, hereinafter the tool terminals, for electrically connecting to a positive battery terminal, a ground battery terminal, and a communication battery terminal of the battery pack 115, hereinafter the battery terminals. Although illustrated as a rail and groove interface, in other embodiments, the battery pack interface 110 may be a receptacle and stem interface. In further embodiments, the battery pack interface 110 may be a battery receptacle to receive a battery.

A divider 125 is placed between the power tool housing 105 and the battery pack housing 120 at the battery pack interface 110. In the illustrated embodiment, the divider 125, when placed between the power tool housing 105 and the battery pack housing 120, electrically isolates at least one of the tool terminals from at least one of the battery terminals. In some embodiments, the divider 125 may isolate all the tool terminals from the battery terminals.

Figure 3:
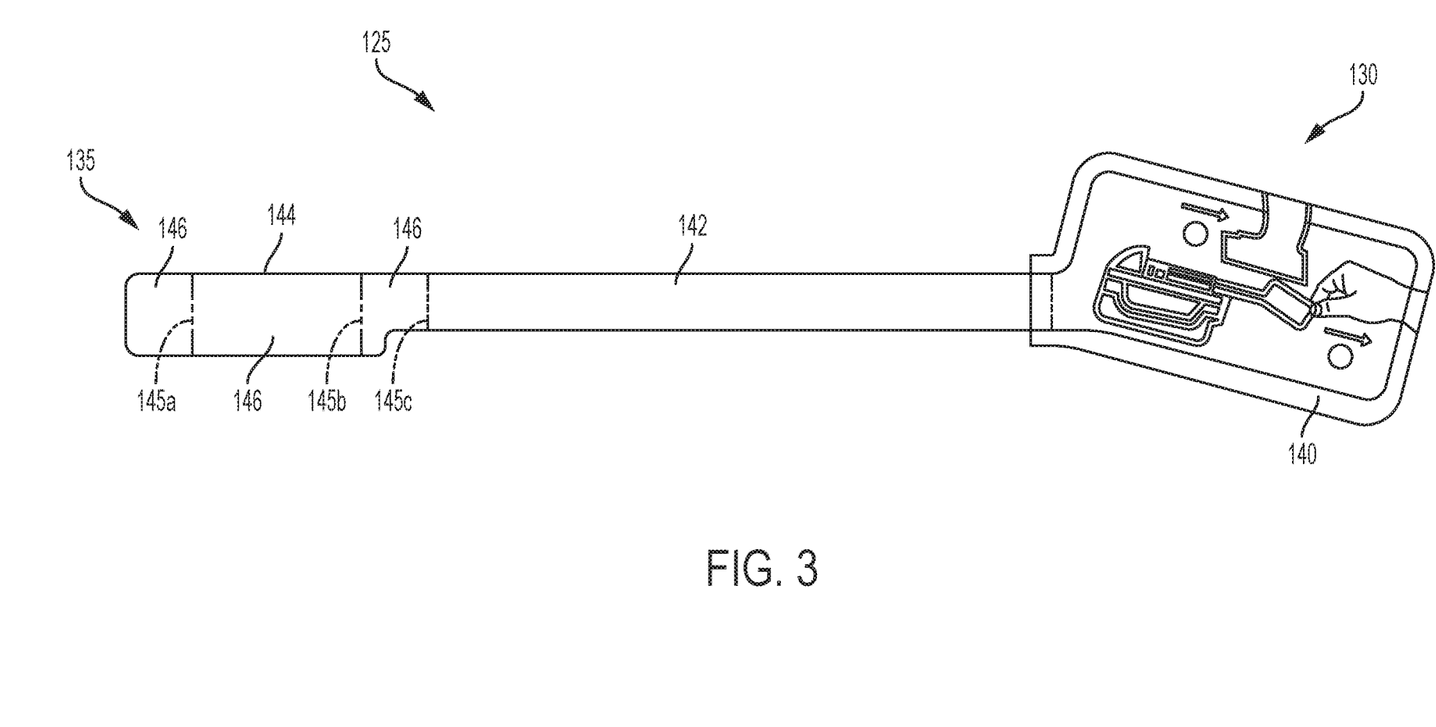
FIG. 3 illustrates a front view of a divider according to one embodiment.

FIG. 3 illustrates a front view of the divider 125. The divider 125 includes an outer portion 130 and an inner portion 135. The outer portion 130 further includes an indicator 140 that provides an indication, or instructions, to a user. For example, the instructions may inform the user that the divider 125 should be removed before use of power tool 100. The inner portion 135, when positioned between the power tool 100 and the battery pack 115, prevents direct contact between at least one of the tool terminals and at least one of the battery terminals. The inner portion 135 includes a long stem 142 with an increased width portion 144. The increased width portion 144 includes one or more folds 145a, 145b, and 145c. In further embodiments, the divider 125 may include fewer or more folds that define fewer or more sections 146 between the folds 145a, 145b, 145c of the divider 125. For example, the divider 125 may include additional folds defining additional sections so that the divider 125 may isolate additional tool terminals from the battery terminals as discussed below.

Figure 4:
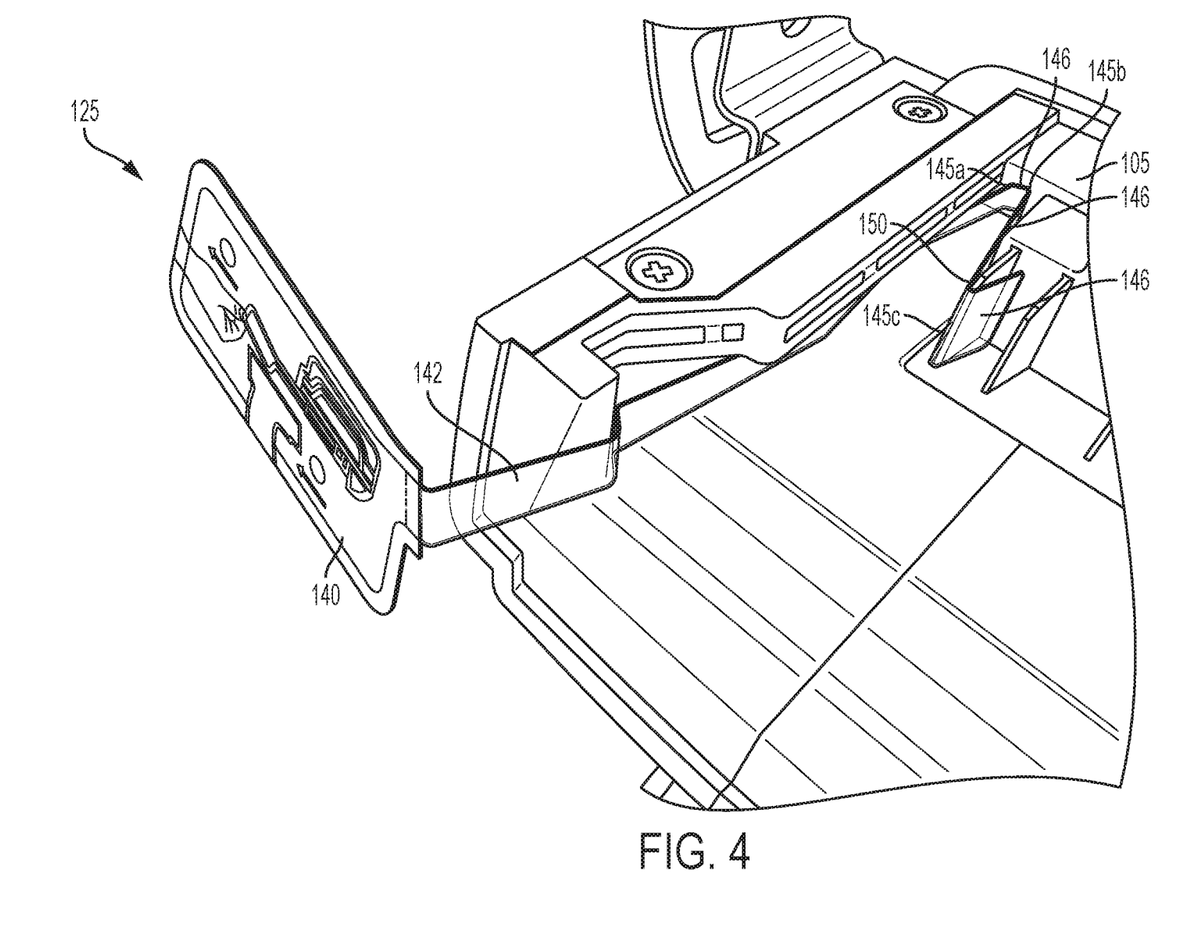
FIG. 4 illustrates a perspective view of the divider of FIG. 3 in contact with a battery interface of the power tool of FIG. 1 according to one embodiment.

FIG. 4 illustrates the divider 125 in contact with a tool terminal 150a of the power tool housing 105. The tool terminal 150a may be the positive tool terminal, the ground tool terminal, or the communication tool terminal. In the illustrated embodiment, the divider 125 is placed in contact with the power tool housing 105, with the fold 145c substantially covering the tool terminal 150a, thus providing electrical isolation between the tool terminal 150a and at least one battery terminal when the battery pack 115 is connected to the power tool 100. In another embodiment, the divider 125 is placed in contact with a battery terminal of the battery pack housing 120. The battery terminal may be the positive battery terminal, the ground battery terminal, or the communication battery terminal. In such an embodiment, the fold 145c substantially covers the battery terminal, thus providing electrical isolation between the tool terminal 150a and at least one battery terminal when the battery pack 115 is connected to the power tool 100.

The divider 125 creates a galvanic isolation between at least one of the tool terminals and at least one of the battery terminals. The galvanic isolation allows signals to pass between at least one of the tool terminals and at least one of the battery terminals, however, stray currents, such as differences in ground potential or currents induced by AC/DC power, are blocked. As such, the divider 125 prevents draw of current from the battery pack 115 before the power tool 100 is ready for use. In some embodiments, the divider 125 may be used to isolate one of the tool terminals from the battery terminals while the power tool 100 is in its original packaging that way the power tool 100 does not draw current from the battery pack 115 while the power tool 100 is being shipped or while on a store shelf before being sold.

Figure 5:
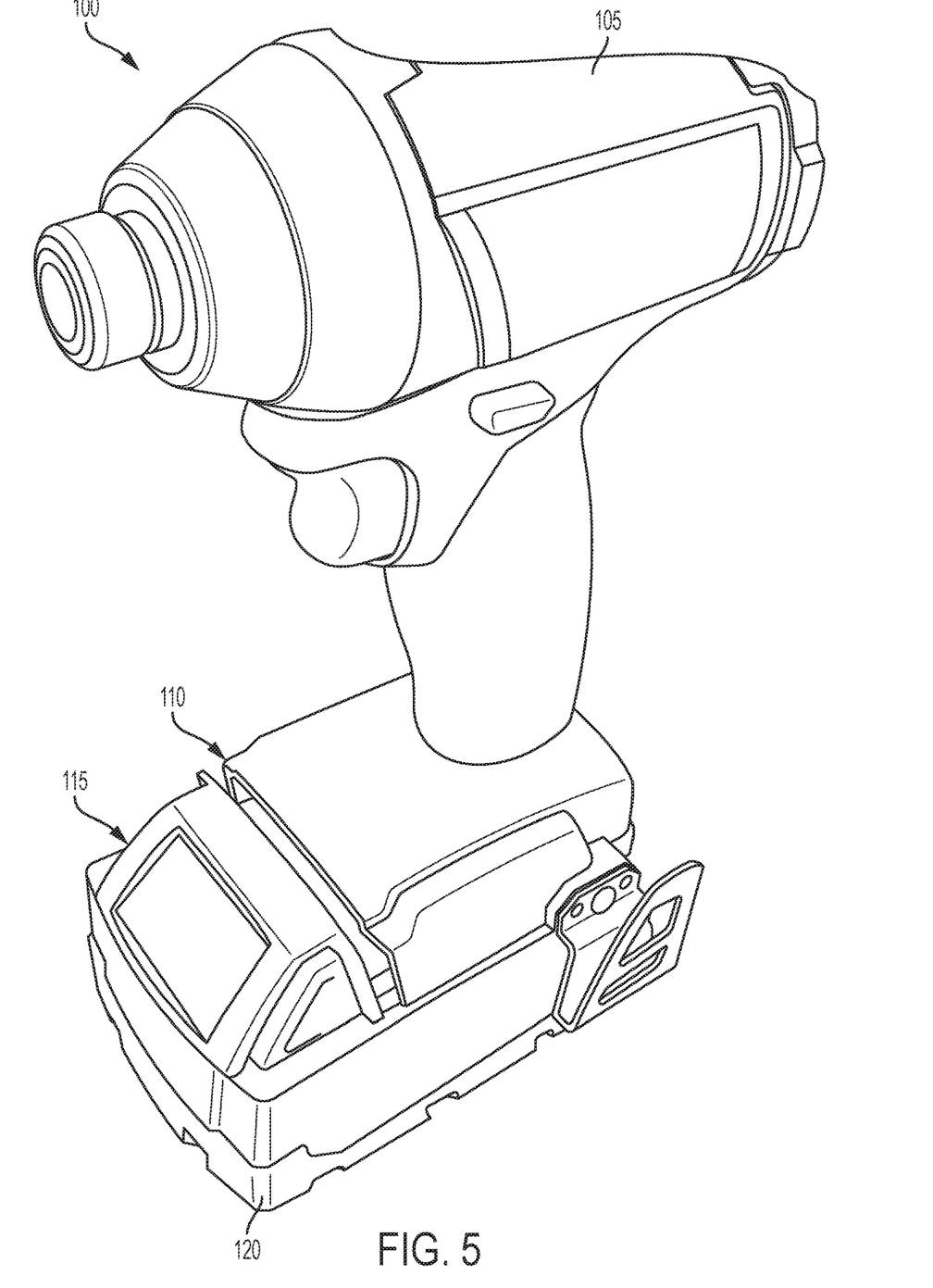
FIG. 5 illustrates the power tool of FIG. 1 without the divider according to one embodiment.

FIG. 5 illustrates the power tool 100 without the divider 125. Once the power tool 100 is ready for use, the divider 125 can be removed from the battery pack interface 110 without removing the battery pack 115. A user pulls the divider 125 from the battery pack interface 110 removing the galvanic isolation and allowing the power tool 100 to draw power from the battery pack 115.

Figure 6:
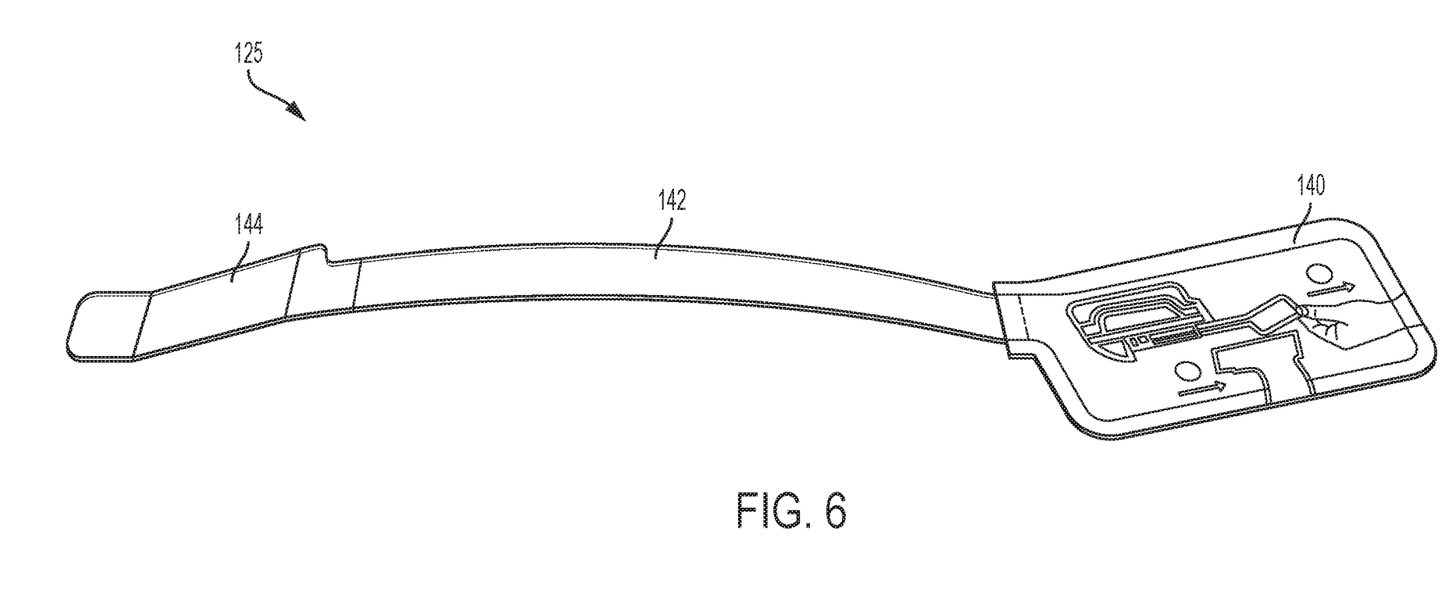
FIG. 6 illustrates a perspective view of the divider of FIG. 3 according to one embodiment.
Figure 7:
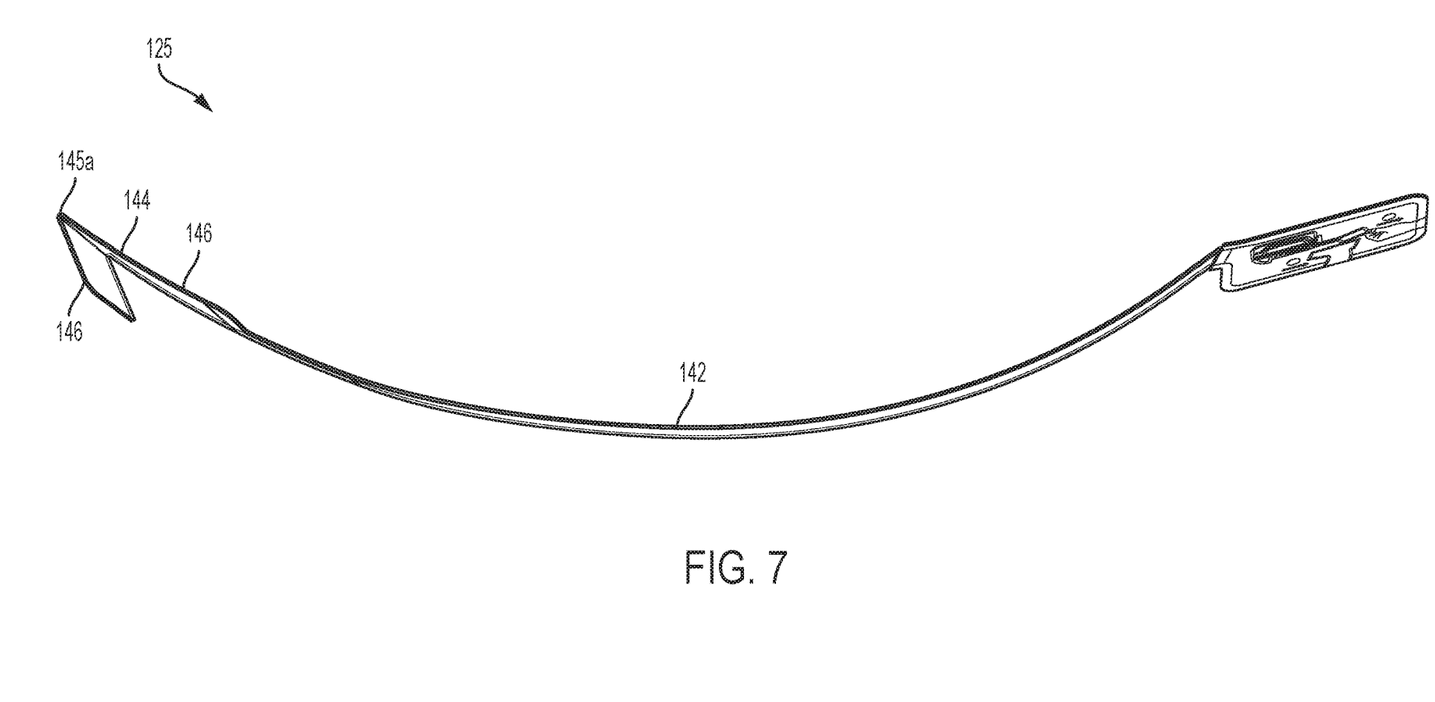
FIG. 7 illustrates a side view of the divider of FIG. 3 according to one embodiment.
Figure 8:
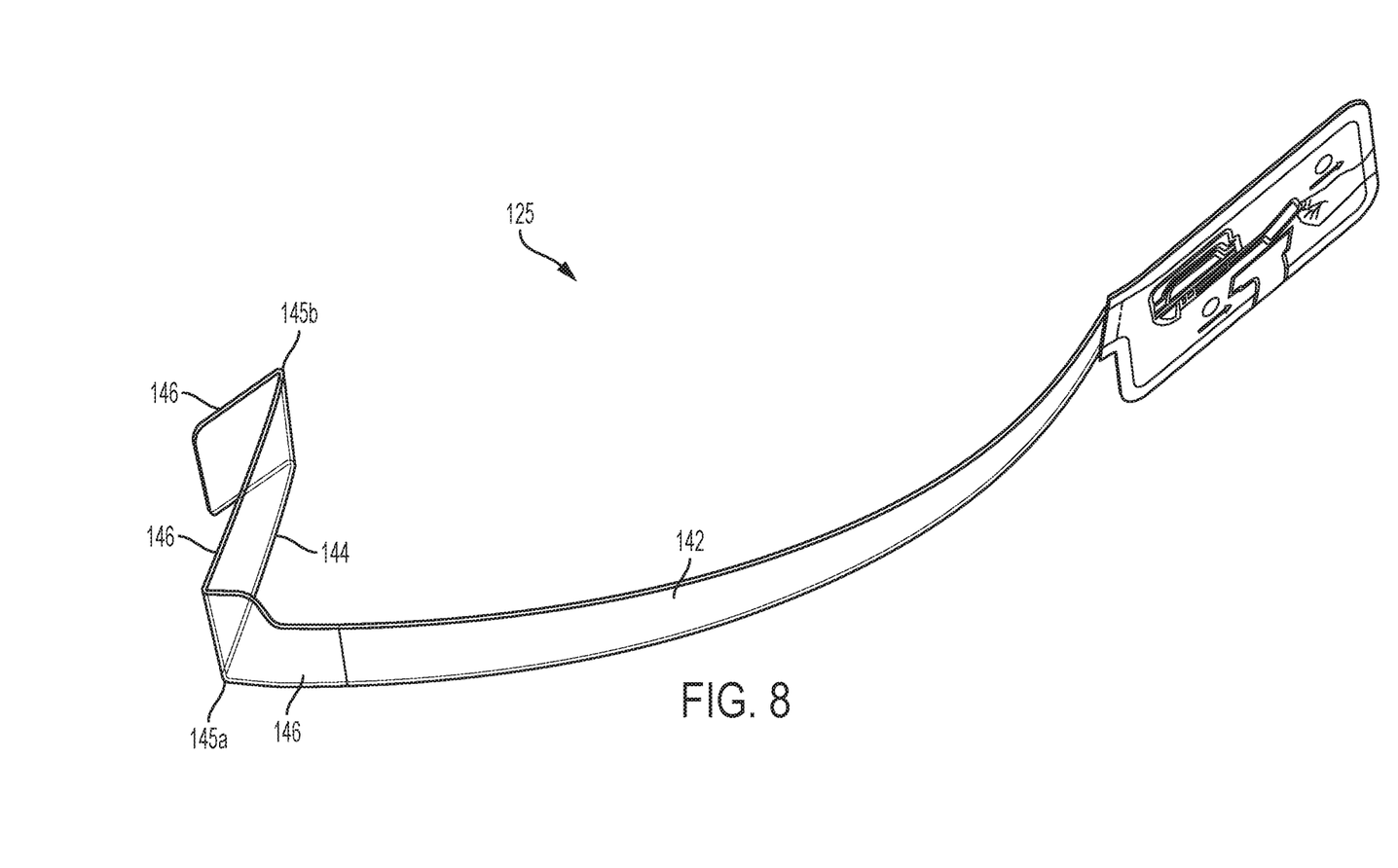
FIG. 8 illustrates a side view of the divider of FIG. 3 according to one embodiment.
Figure 9:
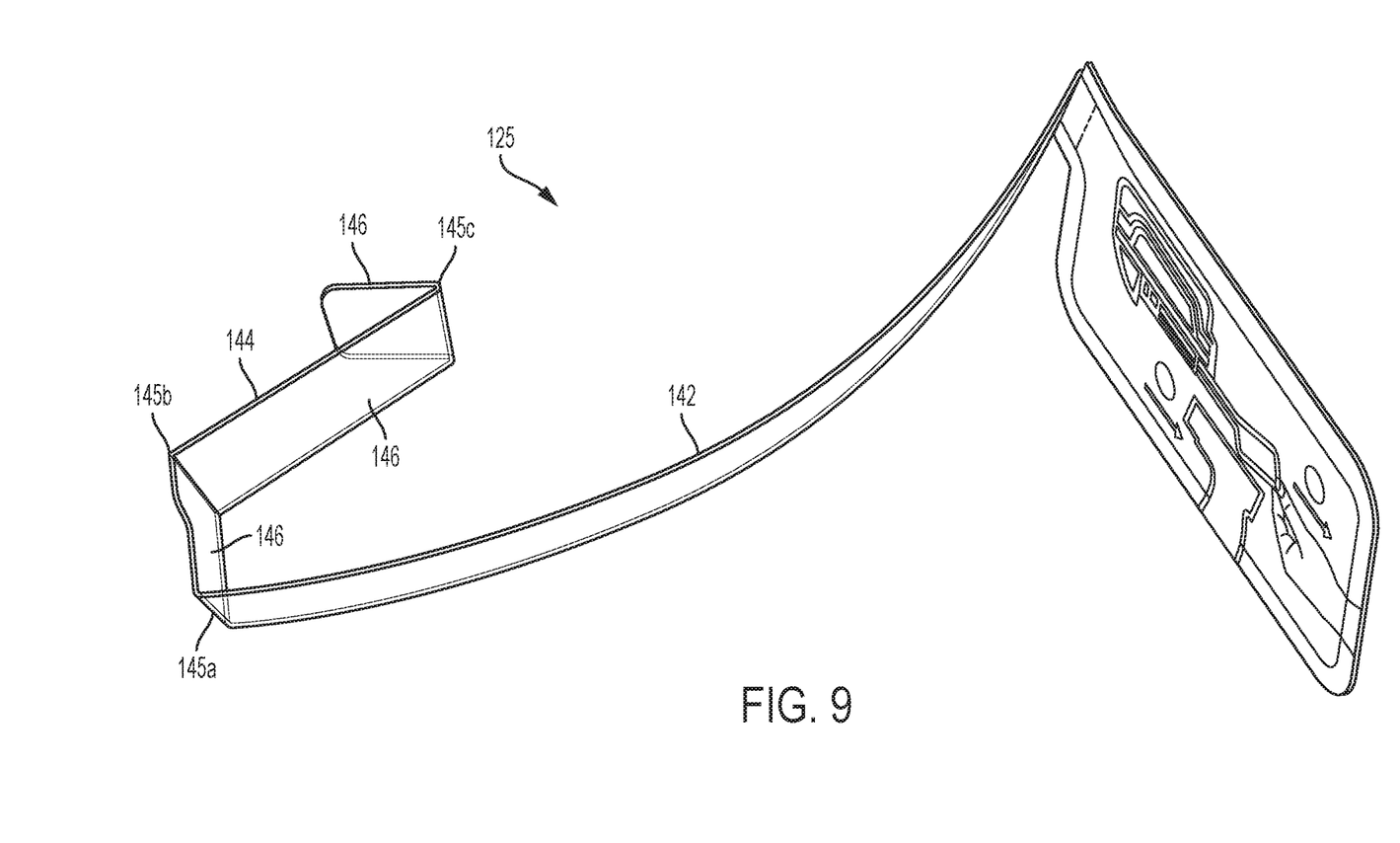
FIG. 9 illustrates a side view of the divider of FIG. 3 according to one embodiment.

FIGS. 6-9 illustrate perspective views of the divider 125 with a varying amount of folds. For example, FIG. 6 illustrates the divider 125 with no folds. FIG. 7 illustrates the divider 125 with a first fold 145a in the stem 142. FIG. 8 illustrates the divider 125 with a first fold 145a and a second fold 145b in the stem 142. FIG. 9 illustrates the divider 125 with a first fold 145a, a second fold 145b, and a third fold 145c.

Figure 10:
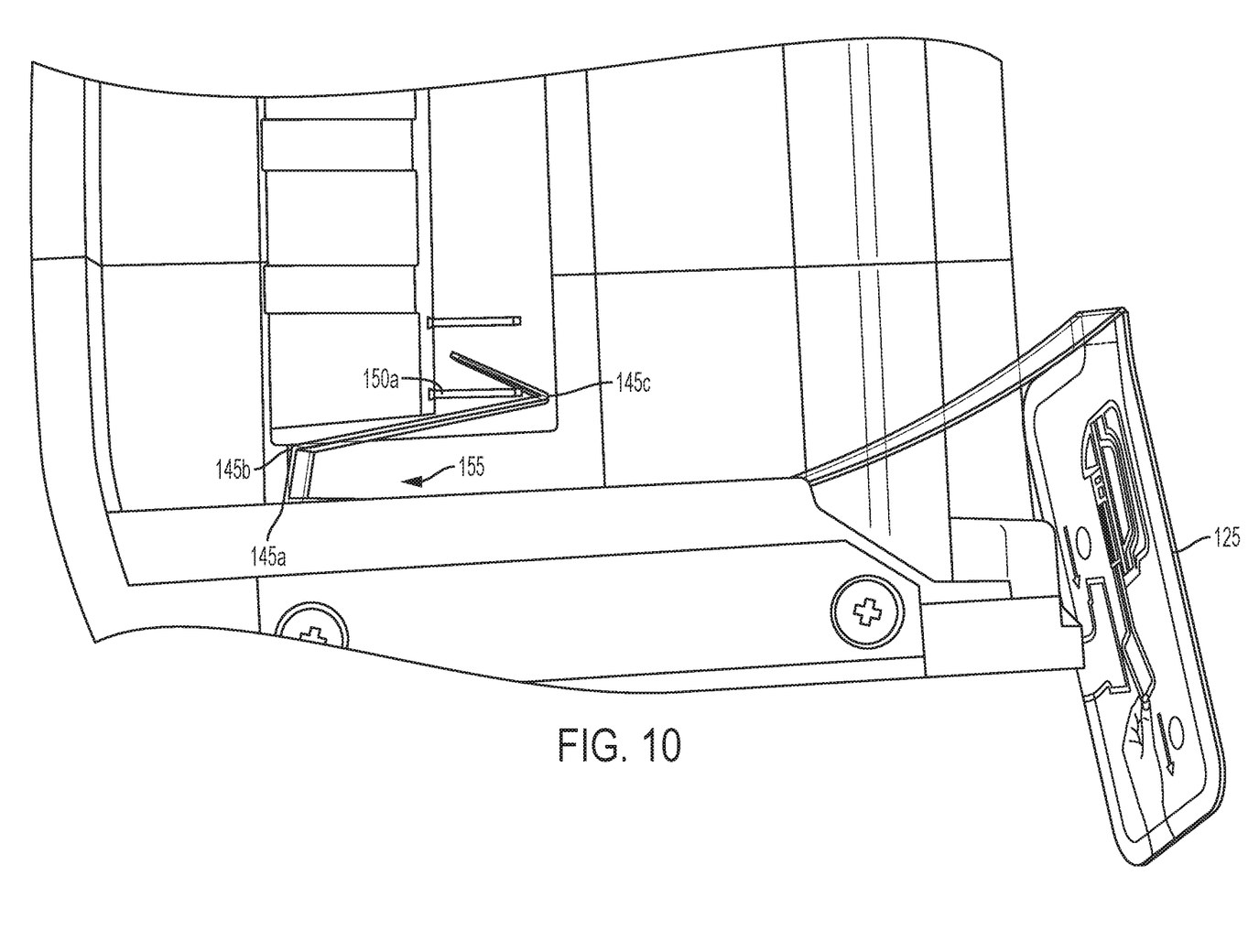
FIG. 10 illustrates a top view of the divider of FIG. 3 in contact with a battery interface of the power tool according to one embodiment.

As illustrated in FIG. 10, the divider 125 is covering the tool terminal 150a. The first and second folds 145a, 145b are positioned within a recess 155 of the battery pack interface 110 and the third fold 145c is positioned over the tool terminal 150a so that the tool terminal 150a is galvanically isolated from a battery terminal when the battery pack 115 is installed on the tool housing 105.

Figure 11:
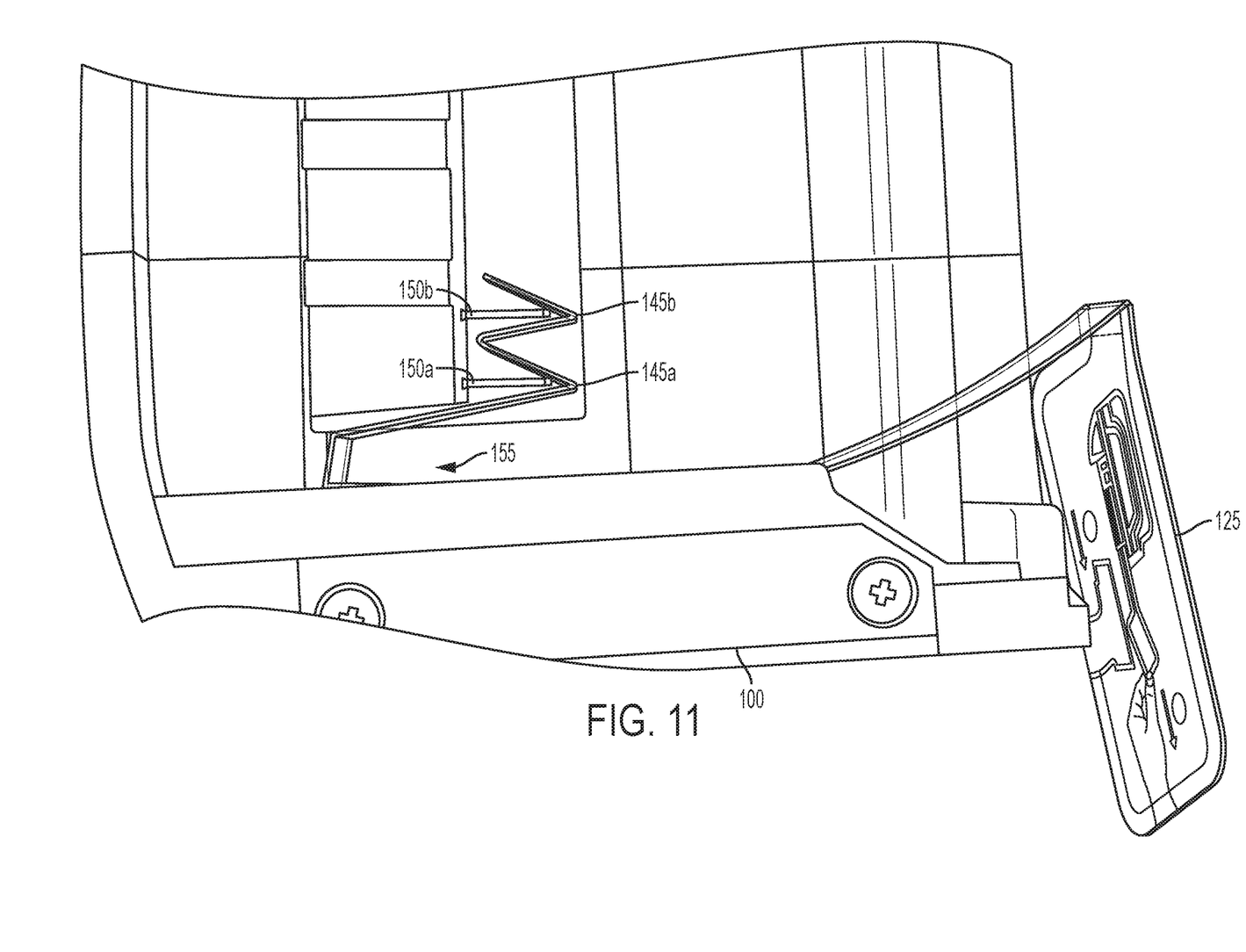
FIG. 11 illustrates a top view of the divider of FIG. 3 in contact with a battery interface of the power tool according to another embodiment.

With reference to FIG. 11, in some embodiments, the divider 125 includes multiple folds 145a, 145b, that cover multiple tool terminals 150a, 150b. A first fold 145a substantially covers a tool terminal 150a, thus providing galvanic isolation between the tool terminal 150a and at least one battery terminal when the battery pack 115 is connected to the power tool 100. A second fold 145b substantially covers a tool terminal 150a, thus providing galvanic isolation between the tool terminal 150b and at least one battery terminal when the battery pack 115 is connected to the power tool 100.

Figure 12:
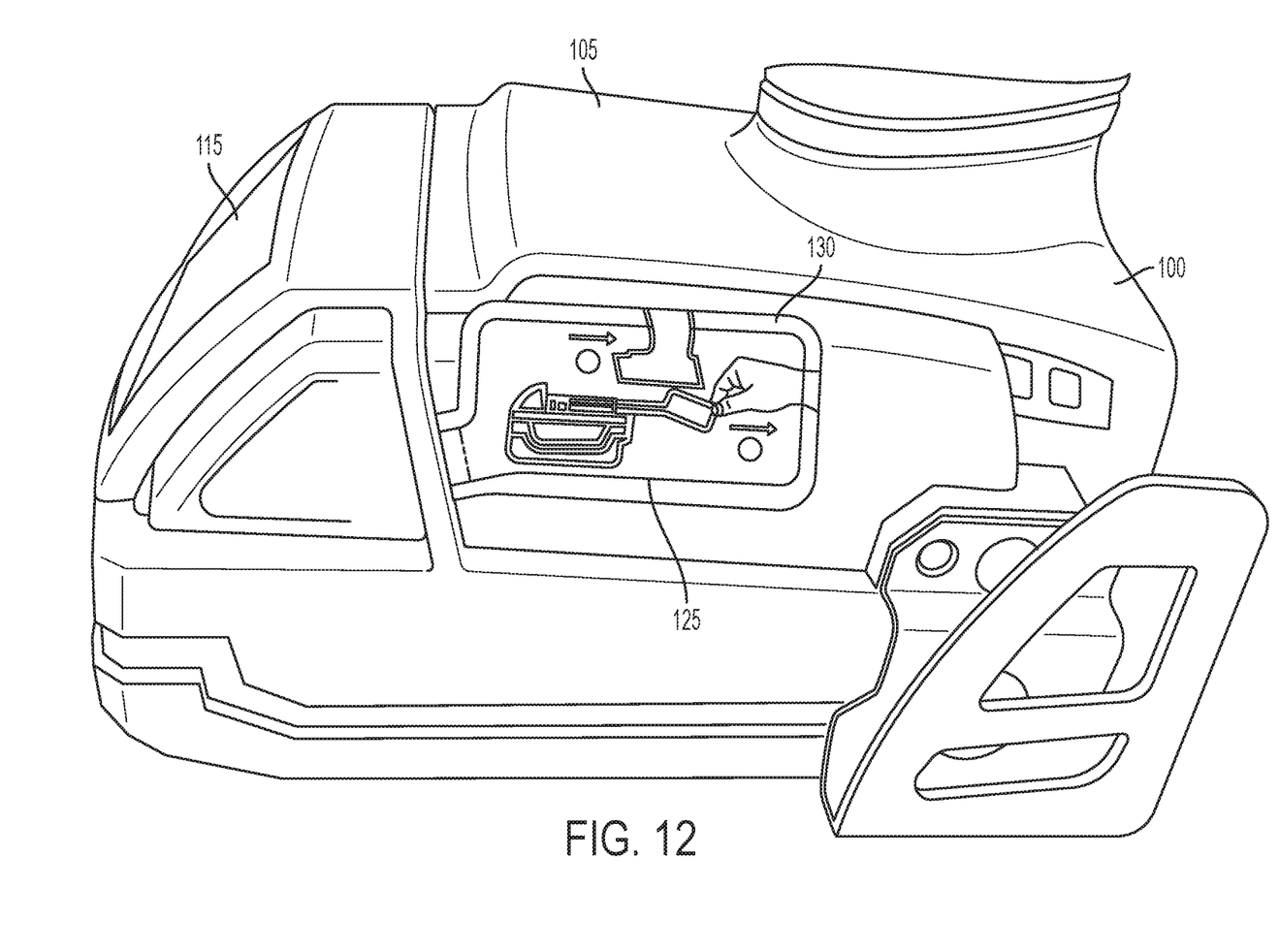
FIG. 12 illustrates a side perspective view of the divider of FIG. 3 placed between the power tool and battery pack of FIG. 2 according to one embodiment.

FIG. 12 illustrates the power tool 100 with the battery pack 115 coupled to the battery pack interface 110 of the tool housing 105 with the divider 125 positioned in a first position. In the first position, the inner portion 135 of the divider 125 is positioned between the battery pack interface 110 and the battery pack 115. The outer portion 130 of the divider 125 is positioned outside the tool housing 105 so that a user may pull the outer portion 130 out of the tool housing 105 to electrical connect the battery pack 115 to the power tool 100.

Various features of the invention are set forth in the following claims.

What is claimed is:

1. A battery protection system for a power tool comprising:
   a power tool housing including a battery pack interface, the battery pack interface including at least one tool electrical terminal;
   a battery including a battery housing and at least one battery electrical terminal; and
   a divider positioned between the at least one battery electrical terminal and the at least one tool electrical terminal when the battery is coupled to the power tool, the divider including at least one fold.

2. The battery protection system of claim 1, wherein the divider is movable between a first position in which the at least one battery electrical terminal of the battery pack is galvanically isolated from the at least one tool electrical terminal of the battery pack interface and a second position in which the at least one battery electrical terminal of the battery pack and the at least one tool electrical terminal of the battery pack interface are electrically coupled.

3. The battery protection system of claim 2, wherein the divider further includes an indicator indicating to a user to move the divider from the first position to the second position before operation of the power tool.

4. The battery protection system of claim 1, wherein the at least one fold is one of a plurality of folds.

5. The battery protection system of claim 4, wherein the at least one tool electrical terminal of the battery pack interface is a first tool electrical terminal, and wherein the battery pack interface further includes a second tool electrical terminal and a third tool electrical terminal.

6. The battery protection system of claim 5, wherein the first tool electrical terminal is a positive terminal, the second tool electrical terminal is a ground terminal, and the third tool electrical terminal is a communication terminal.

7. The battery protection system of claim 5, wherein the plurality of folds include a first fold, a second fold, and a third fold.

8. The battery protection system of claim 7, wherein the at least one battery electrical terminal of the battery pack is a first battery electrical terminal, and wherein the battery pack further includes a second battery electrical terminal and a third battery electrical terminal.

9. The battery protection system of claim 8, wherein the first fold of the divider galvanically isolates the first battery electrical terminal from the first tool electrical terminal, the second fold of the divider galvanically isolates the second battery electrical terminal from the second tool electrical terminal, and the third fold of the divider galvanically isolates the third battery electrical terminal from the third tool electrical terminal.

10. The battery protection system of claim 9, wherein the first battery electrical terminal is a positive terminal, the second battery terminal is a ground terminal, and the third terminal is a communication terminal.

* * * * *